United States Patent [19]

Sydansk

[11] Patent Number: 5,431,226
[45] Date of Patent: Jul. 11, 1995

[54] PROCESS FOR REDUCING PERMEABILITY IN A HIGH-TEMPERATURE SUBTERRANEAN HYDROCARBON-BEARING FORMATION UTILIZING A DECARBOXYLATED CROSSLINKING AGENT

[75] Inventor: Robert D. Sydansk, Littleton, Colo.

[73] Assignee: Marathon Oil Company, Findlay, Ohio

[21] Appl. No.: 176,875

[22] Filed: Jan. 3, 1994

[51] Int. Cl.$^6$ .......................................... E21B 33/138
[52] U.S. Cl. .................................... 166/295; 166/288; 166/300; 507/903; 523/130
[58] Field of Search ................ 166/270, 288, 294, 295, 166/300; 523/130

[56] References Cited

U.S. PATENT DOCUMENTS

| | | | |
|---|---|---|---|
| 3,762,476 | 10/1973 | Gall | 166/294 |
| 4,665,987 | 5/1987 | Sandiford et al. | 166/288 |
| 4,683,949 | 8/1987 | Sydansk et al. | 166/270 |
| 4,706,754 | 11/1987 | Smith | 166/295 |
| 4,770,245 | 9/1988 | Sydansk | 166/295 |
| 4,917,186 | 4/1990 | Mumallah | 166/295 |
| 5,131,469 | 7/1992 | Lockhart et al. | 166/295 |
| 5,143,958 | 9/1992 | Lockhart et al. | 524/219 |
| 5,219,475 | 6/1993 | Lockhart et al. | 252/8.551 |
| 5,219,476 | 6/1993 | Lockhart et al. | 252/8.551 |
| 5,338,465 | 8/1994 | Lockhart et al. | 166/295 X |

OTHER PUBLICATIONS

Lockhart et al., "A New Gelatin Technology For In-Depth Placement of $Cr^{3+}$/Polymer Gels In High-Temperature Reservoirs," SPE/DOE 24194, Apr. 1992.

Lockhart et al., "Gelation-Delaying Additives For $Cr^{3+}$/Polymer Gels", SPE 25221, Mar. 1993.

*Primary Examiner*—George A. Suchfield
*Attorney, Agent, or Firm*—Jack L. Hummel; Jack E. Ebel

[57] ABSTRACT

A process and composition are provided for permeability reduction in a hydrocarbon-bearing formation to improve hydrocarbon recovery therefrom. The process includes placement of a crosslinked polymer gel in the treatment region preceded by surface preparation of a gelation solution from which the gel is formed. The gelation solution contains a crosslinkable polymer, a transition metal/poly-carboxylate precursor complex and an aqueous solvent. The gel is placed in the treatment region by injecting the gelation solution into a well bore in fluid communication with the formation, activating the gelation solution in situ, displacing the gelation solution into the desired treatment region and gelling the solution to completion forming the permeability-reducing gel in situ. The gelation rate is retarded in a controlled manner by adjusting the molar ratio of the polycarboxylate to transition metal in the precursor complex of the gelation solution.

8 Claims, No Drawings

PROCESS FOR REDUCING PERMEABILITY IN A HIGH-TEMPERATURE SUBTERRANEAN HYDROCARBON-BEARING FORMATION UTILIZING A DECARBOXYLATED CROSSLINKING AGENT

BACKGROUND OF THE INVENTION

1. Technical Field

The invention relates to a process for recovering hydrocarbons from a subterranean formation, and more particularly to a hydrocarbon recovery process using a permeability-reducing agent.

2. Background Information

The utility of crosslinked polymer gels as a permeability-reducing agent in subterranean hydrocarbon-bearing formations to facilitate hydrocarbon recovery therefrom has long been known in the art. U.S. Pat. No. 3,762,476 to Gall is representative of conventional teaching in the art of its time. Gall discloses a conformance improvement treatment process, wherein a permeability-reducing crosslinked polymer gel is formed in situ by injecting an aqueous slug containing a crosslinkable water-soluble polymer into the subterranean treatment region followed in sequence by an aqueous slug containing a crosslinking agent made up of a polyvalent metal cation complexed with a retarding anion. Useful polyvalent metal cations listed in Gall include iron(II), iron(III), aluminum(III), chromium(III), calcium(II), and magnesium(II). Useful retarding anions complexed with the cation include citrate, phosphate, acetate, nitrilotriacetate, and tartrate.

Sequential injection of the gel components as separate and distinct slugs into the treatment region is essential to the teaching of treatment processes such as Gall insofar as surface contacting of the polymer and crosslinking agent was believed to cause premature gelation of the gel components prior to reaching the treatment region. If prematurely formed at the surface or in the well bore, placement in the treatment region of the gels taught by Gall was difficult, if not impossible, to achieve. Consequently, sequential injection of the gel components in concept avoided premature gelation by delaying contacting of the components until they were displaced out into the treatment region of the formation.

In situ contacting of the polymer and crosslinking agent as required by Gall, nevertheless, proved operationally unattractive in many hydrocarbon recovery applications because of the difficulty in achieving adequate mixing of the gel components in situ. Without adequate mixing, the gels of Gall were poorly formed, resulting in weak and unstable gels that performed ineffectively as permeability-reducing agents.

In the face of conventional teaching represented by Gall, U.S. Pat. No. 4,683,949 to Sydansk et al. identified specific gel components and gelation parameters for a crosslinked polymer gel having utility in a conformance improvement treatment process, whereby the polymer and crosslinking agent of the gel could be mixed at the surface in a homogeneous gelation solution and placed in the treatment region by injection therein as a single slug. Thus, Sydansk et al. overcame the inherent operational limitations of processes such as Gall that required sequential injection and in situ mixing of the gel components. Sydansk et al. was predicated on the finding that a chromium(III)/carboxylate complex crosslinking agent could be mixed with a crosslinkable polymer at the surface to form a gelation solution producing gels that were uniquely stable and highly predictable, yet capable of practical long-term placement in subterranean treatment regions, even in hostile environments. The process of Sydansk et al. successfully enabled formulation of gels having a broad range of physical characteristics for effective conformance improvement treatments under varying in situ conditions.

The teaching of Sydansk et al. has subsequently been adapted to certain specific, typically problematic, conformance improvement treatment applications. For example, in some high-temperature or far well bore applications, it has been found advantageous to include a supplemental delaying agent in the gelation solution along with the chromium(III)/carboxylate complex taught by Sydansk et al. The delaying agent avoids excessive crosslinking of the polymer before the gelation solution reaches the desired treatment region, which would otherwise inordinately increase the difficulty of placing the gel in the treatment region.

U.S. Pat. No. 4,706,754 to Smith discloses the addition of a specific supplemental delaying agent to a gelation solution containing a water-soluble crosslinkable polymer and a metal/carboxylate complex crosslinking agent. The supplemental delaying agent comprises excess carboxylate anions in the form of a carboxylic acid which delay gelation of the polymer and crosslinking agent, thereby facilitating heretofore problematic placement of the crosslinked gels in high-temperature or remote treatment regions.

U.S. Pat. Nos. 5,131,469; 5,143,958; 5,219,475 and 5,219,476 to Lockhart et al. likewise teach gelation solutions containing a crosslinkable polymer, a crosslinking agent, and a supplemental delaying agent. The delaying agent is selected from one of several specified ligands in the form of an organic acid. In distinction to Smith, however, the Lockhart et al. patents teach a crosslinking agent having the crosslinking metal cation initially in the form of a water-soluble inorganic chromium(III) salt, rather than an organic metal/carboxylate complex as in Smith.

It is nevertheless apparent that the Smith and Lockhart et al. patents all require the addition of a discrete delaying agent to a conventional gelation solution, such as taught by Sydansk et al., to satisfactorily retard the gelation rate of the gelation solution and enable placement of the resulting gel in a wide range of subterranean treatment regions. Lockhart et al., "A New Gelation Technology For In-Depth Placement Of $Cr^{3+}$/Polymer Gels In High-Temperature Reservoirs," SPE/DOE 24194, teaches the formation of crosslinked polymer gels, wherein the crosslinking agent is a complex containing malonate and chromium(III) in a molar ratio of 3:1. This complex produces moderate gelation delays. However, if extended gelation delays are desired, it is necessary to supplement the crosslinking complex with the addition of a separate delaying agent to the gelation solution. The supplemental delaying agent taught by Lockhart et al. is uncomplexed malonate.

It has been found in accordance with the present invention, however, that similar gelation delays can be achieved for crosslinked polymer gels without the addition of a discrete delaying agent to the gelation solution. Accordingly, the present invention addresses a need that has existed for an effective gelation solution that can be formulated in the absence of a delaying agent, yet has a sufficiently retarded gelation rate for effective placement in high-temperature treatment regions.

It is, therefore, an object of the present invention to provide a process of forming a crosslinked polymer gel for permeability reduction in a subterranean hydrocarbon-bearing formation. It is also an object of the present invention to provide a gelation solution composition that forms such a crosslinked polymer gel. It is a further object of the present invention to retard the gelation rate of the gelation solution by employing a precursor complex in the gelation solution that is essentially inactive with respect to the polymer at ambient surface temperatures, yet transforms to an active crosslinking agent complex with respect to the polymer at elevated temperatures experienced in certain subterranean hydrocarbon-bearing formations. It is another object of the present invention to control the degree of gelation rate retardation by adjusting the relative proportions of chemical species within the precursor complex of the gelation solution.

SUMMARY OF THE INVENTION

The present invention is a process and composition for improving hydrocarbon recovery from a high-temperature subterranean hydrocarbon-bearing formation penetrated by a well bore. Improved hydrocarbon recovery is effectuated in accordance with the invention by employing a specific composition to reduce permeability within a desired treatment region of a high-temperature subterranean formation penetrated by a fluid injection well bore or a hydrocarbon production well bore. Encompassed within the scope of the invention are conformance improvement treatment, coning treatment, fluid shutoff treatment and squeeze cement treatment applications.

The permeability-reducing composition is used in a conformance improvement treatment to reduce the permeability of a high permeability region in the formation. The treatment particularly improves vertical and areal conformance within the formation and correspondingly improves flow profiles and sweep efficiencies of injected or produced fluids in the formation. The treatment can also prevent the diversion of injected fluids away from a hydrocarbon-producing zone into adjacent thief zones of or proximate to the formation.

The permeability-reducing composition is used in a coning treatment to selectively block the flow of unwanted fluids into a hydrocarbon-producing zone of the formation from a second proximate zone or formation, such as an underlying zone or formation containing an aquifer. Alternatively, the coning treatment selectively blocks the flow of unwanted fluids into the hydrocarbon-producing zone from a proximate zone or formation, such as an overlying gas cap. Typically, the proximate zone or formation being partially or completely isolated from the hydrocarbon-producing zone contains producible, but unwanted, fluids such as water or gas. The coning treatment prevents or reduces intrusion of the unwanted fluids into the hydrocarbon producing zone under a water or gas coning mechanism.

The permeability-reducing composition is used in a squeeze cement treatment to shut off and abandon a zone of the formation in direct communication with the well bore penetrating the formation or to shutoff a volume proximate to the well bore. Squeeze cementing enables essentially total fluid shutoff of the abandoned zone or proximate volume. This enables the well bore to be recompleted or reconfigured for more effective post-treatment utilization. The permeability-reducing composition can also be used in a squeeze cement treatment to remediate small well bore leaks including casing leaks by shutting off small openings or annuli in or along the well bore.

The permeability-reducing composition is used in a fluid shutoff treatment to reduce the undesirable flow of a liquid or gas within a formation. Oftentimes the fluid shutoff treatment is used to reduce the undesirable entry of water or gas into a well bore. In some cases the fluid shutoff treatment is employed in a production well bore to reduce the volume of water entering the well bore via channelling. Such fluid shutoff treatments may be particularly useful in reducing the flow of fluids from an injection well bore into the production well bore.

The present process, in each of its above-recited applications, requires placement of a crosslinked polymer gel in a desired treatment region of the formation to act as a permeability-reducing agent therein. Placement of the gel is preceded by preparation of a gelation solution at the surface from which the gel is formed. The gelation solution initially contains an aqueous solvent, a crosslinkable polymer and a chromium(III)/poly-carboxylate complex. This complex, which is essentially inert with respect to the polymer at the ambient surface temperature, is termed a precursor complex since it is a precursor of the crosslinking agent complex that ultimately crosslinks the polymer. In a further embodiment, the present invention is the composition of the above-recited gelation solution.

The gel is placed in the desired treatment region by injecting the gelation solution as a homogeneous slug into a well bore in fluid communication with the hydrocarbon-bearing formation. The formation has a temperature that equals or exceeds the decarboxylation reaction temperature of the polycarboxylate species in the precursor complex. Accordingly, when the gelation solution enters the formation, the precursor complex is heated to a temperature that decarboxylates the polycarboxylate species to a mono-carboxylate species, forming the desired chromium(III)/mono-carboxylate crosslinking agent complex that is active with respect to the polymer.

The gelation solution is displaced into the desired treatment region either before or after it is activated in situ and the solution is gelled to completion in the treatment region, forming a permeability-reducing gel therein. Since the gelation rate is a function of the ratio of monocarboxylate to poly-carboxylate species in the complex at any given time, the level of retardation of the gelation rate can be effectively increased by increasing the initial molar ratio of poly-carboxylate species to chromium(III) species in the precursor complex. In this manner, complete gelation of the gelation solution is prevented until the solution reaches the treatment region.

DESCRIPTION OF PREFERRED EMBODIMENTS

A number of specific terms are used throughout the specification to describe the process of the present invention and are defined as follows. A "subterranean hydrocarbon-bearing formation" is a subterranean geological structure consisting essentially of "matrix," and in some instances, "anomalies." The term "subterranean hydrocarbon-bearing formation" is synonymous with the term "reservoir." An "anomaly" is a volume within a formation having very high permeability relative to the matrix. The term "anomaly" is inclusive of such highly permeable volumes as fractures, fracture networks, joints, cracks, fissures, vugs, voids, solution channels, caverns, washouts, cavities, and the like. The "matrix" is generally characterized as substantially continuous, sedimentary geological material having a very low permeability relative to an anomaly. In addition, the matrix is often characterized as competent.

The term "well bore" is defined as a bore hole extending from the earth surface to the subterranean hydrocarbon-bearing formation. Thus, a well bore is a conduit providing fluid communication between the surface and the subterranean hydrocarbon-bearing formation penetrated thereby. A production well bore enables the removal of fluids from the subterranean hydrocarbon-bearing formation to the surface and an injection well bore enables the placement of fluids into the subterranean hydrocarbon-bearing formation from the surface. It is noted that a given well bore can function interchangeably as a production well bore or an injection well bore depending on whether a fluid is being removed from or placed in the well bore. The term "well" is synonymous with the term "well bore." Other terms used herein have definitions in accordance with the conventional usage of a skilled artisan, unless otherwise defined hereafter.

The process of the present invention comprises preparing a flowing liquid gelation solution at the earthen surface, injecting the gelation solution into a well bore in fluid communication with a subterranean hydrocarbon-bearing formation, displacing the gelation solution into a desired treatment region of the formation, activating the gelation solution in situ, and gelling the solution in situ, thereby placing a permeability-reducing gel in the treatment region. It is understood that in situ activation of the gelation solution encompasses activation of the solution either before or after it is displaced into the treatment region. The order in which the activation and displacement steps are recited herein is merely for descriptive purposes and does not limit the order of occurrence in the practice of the invention.

Following activation, the gelation solution is transformable from a solution to a gel by aging the activated solution to maturity for a predetermined gel time. A "gel" is defined herein as a continuous three-dimensional crosslinked polymeric network integrating a liquid into the interstices of the network.

The initial gelation solution at the surface comprises a crosslinkable polymer and a precursor complex both in solution with an aqueous solvent. Crosslinkable polymers are well known in the art and any such water-soluble carboxylate-containing polymer, whether a biopolymer or a synthetic polymer, has utility in the gelation solutions of the present invention. Water-soluble carboxylate-containing biopolymers having utility herein include polysaccharides and modified polysaccharides, such as xanthan gum, guar gum, succinoglycan, scleroglycan, polyvinylsaccharides, carboxymethylcellulose, o-carboxychitosans, hydroxyethylcellulose, hydroxypropylcellulose, modified starches, and chemically modified derivatives thereof.

Water-soluble carboxylate-containing synthetic polymers having utility herein are preferably acrylamide polymers. Acrylamide polymers are polymers having one or more acrylamide groups and include polyacrylamide (PA), partially hydrolyzed polyacrylamide (PHPA), as well as copolymers, terpolymers and tetrapolymers of acrylamide. Exemplary copolymers include acrylamide and acrylate copolymers and copolymers with AMPS or vinylpyrrolidone.

PA, as defined herein, has from about 0% to about 3% of its amide groups hydrolyzed. Although 0% hydrolyzed PA initially lacks any carboxylate groups, PA generates carboxylate groups through autohydrolysis under the conditions of the present process, thereby satisfying the definition of carboxylate-containing polymers having utility within the scope of the present invention. PHPA has greater than about 3% of its amide groups hydrolyzed. The average molecular weight of an acrylamide polymer having utility herein is generally in a range between about 10,000 and about 50,000,000, preferably between about 150,000 and about 30,000,000, and most preferably between about 200,000 and about 25,000,000.

Complexes having utility in the present gelation solution are water-soluble crosslinking agent precursors containing a transition metal cation and an organic poly-carboxylate anion. The term "poly-carboxylate anion" as used herein encompasses carboxylate anionic species containing two or more carboxylate groups, such as oxalate, malonate, succinate, glutarate, and derivatives thereof. The poly-carboxylate anions are generally obtained from the corresponding acids or salts thereof. The complex is typically prepared by reacting a salt or acid of the poly-carboxylate anion with an inorganic or organic salt of the transition metal cation. The complex may also contain one or more additional species that balance the charge of the complex or are otherwise present, but are not essential to the polymer crosslinking function of the complex, such as water molecules or sodium or potassium cations.

The precursor complex is essentially inactive with respect to the polymer at ambient surface temperatures potentially encountered, i.e., in a range between about $-40°$ and $50°$ C. The precursor complex is, however, convertible to an active crosslinking agent complex with respect to the polymer at temperatures typically encountered in high-temperature hydrocarbon-bearing formations, i.e., at least about $100°$ C. and preferably greater than about $120°$ C. Preferred among such precursor complexes are those including one or more chromium(III) cations complexed with one or more poly-carboxylate anions. An example of a preferred complex is one or more chromium(III) cations complexed with one or more malonate anions which is prepared by reacting malonic acid or a malonate salt with an organic or inorganic chromium(III) salt, such as chromium chloride, or a chromium(III)/monocarboxylate complex, such as a chromium(III)/acetate complex.

The aqueous solvent of the gelation solution is substantially any aqueous liquid capable of forming a solution with the selected polymer and precursor complex. The term "solution" as used herein, in addition to true solutions, is intended to broadly encompass dispersions, emulsions, or any other homogeneous mixture of the gelation solution components in the aqueous solvent. The solvent is preferably either a fresh water or a brine, such as sea water or a produced water from the subterranean formation. Produced water can be advantageous because of its low-cost availability and because it enables the practitioner to return the produced water to the formation, thereby eliminating disposal thereof.

The gelation solution is prepared by admixing all of the solution components, including the polymer, precursor complex, and solvent, together at the surface to form a homogeneous injectable fluid. Surface admixing broadly encompasses batch mixing the components in bulk and subsequently injecting the resulting gelation solution into the well bore or mixing the components in-line near the well head and injecting the gelation solution into the well bore. Thus, for example, surface admixing is accomplished by combining the precursor complex in the selected aqueous solvent. The precursor complex can initially be in a solid or liquid state. Upon combining the precursor complex and solvent, the resulting solution is mixed with the polymer in a solid or liquid state to obtain the gelation solution. It is further apparent that other mixing sequences are possible and fall within the scope of the present invention.

The polymer concentration of the resulting gelation solution is generally at least about 300 ppm, preferably at least about 1,500 ppm, and most preferably within a range between about 2,000 ppm and about 100,000 ppm. The chromium(III) cation concentration in solution is generally between about 10 ppm and about 20,000 ppm, and preferably between about 20 ppm and about 4,000 ppm. The molar ratio of poly-carboxylate anions to chromium(III) cations in the precursor complex is preferably between about 0.5:1 and 100:1, more preferably between about 3:1 and 30:1, still more preferably greater than 3:1, and most preferably at least 3.5:1.

The gelation solution of the present invention has utility in substantially any permeability-reduction treatment related to hydrocarbon recovery. Permeability-reduction treatments can be alternatively termed fluid flow capacity-reduction treatments, and include conformance improvement treatments, coning treatments, fluid shutoff treatments, and squeeze cement treatments.

In the practice of a conformance improvement treatment, the gelation solution is injected into a well bore penetrating the subterranean hydrocarbon-bearing formation. Although, the well bore can be either an injection or a production well bore, it is often an injection well bore in conformance improvement treatment applications. The gelation solution is displaced from the well bore into the desired treatment region that is often a zone (also termed a horizontal stratum) containing higher permeability matrix proximate to the lower permeability hydrocarbon producing zone. The treatment region can alternatively be a high permeability anomaly, such as fractures, in the hydrocarbon producing zone or a zone proximate thereto. The gelation solution is activated in situ to induce crosslinking between appropriate sites of the same or other polymer molecules creating the network structure of the gel. The terms "crosslinking", "gelling" and "gelation" are used synonymously herein. Partial crosslinking of the polymer by the crosslinking agent may occur in the high-temperature formation before the solution reaches the treatment region, but complete crosslinking resulting in gel formation is delayed in accordance with the present invention until at least a substantial portion of the gelation solution is in place in the treatment region.

Activation of the gelation solution in accordance with the present invention is effectuated by heating the polycarboxylate of the complex to a temperature greater than or equal to the decarboxylation reaction temperature of the polycarboxylate. Since the reservoir temperature of high-temperature hydrocarbon-bearing formations often exceeds the decarboxylation reaction temperature, requisite heating of the complex can be provided in situ. When the poly-carboxylate reaches the decarboxylation reaction temperature, it decarboxylates from the poly-carboxylate species to a monocarboxylate species. Thus, for example, a chromium(III)/malonate precursor complex is transformed to a chromium(III)/acetate crosslinking agent complex by the decarboxylation reaction of the malonate species.

Whereas poly-carboxylate anionic species are often very strong ligands that essentially block effective polymer crosslinking, the mono-carboxylate anionic species are usually weaker ligands that permit polymer crosslinking. Consequently, the gelation solution gels to completion once the poly-carboxylate is decarboxylated. It is further noted that even in cases where the poly-carboxylate permits some gel formation, the gels formed thereby tend to be weaker and less stable than counterpart gels formed from chromium(III) complexes containing mono-carboxylate species.

For a given poly-carboxylate species, the polymer gelation rate can be retarded to a greater degree by increasing the molar ratio of poly-carboxylate to transition metal in the complex. In particular, it has been found that greater retardation can be achieved by increasing the molar ratio above 3:1 in the complex and preferably to at least 4:1. Conversely, the gelation rate can be retarded to a lesser degree by decreasing the ratio of poly-carboxylate to transition metal in the complex. Thus, the gelation rate and correspondingly the gel time of the solution can be controlled by adjusting the relative proportions of chemical species within the precursor complex.

Other treatment region conditions can also influence the selection of a specific composition for the gelation solution. In general, placement of a gel in less permeable matrix preferentially dictates selection of a gel having relatively limited structure. The degree of structure of the gel formulated in the manner of the present invention is inter alia a function of the polymer properties, the polymer concentration, and the degree and character of crosslinking in the gelation solution.

In general, the degree of structure of a gel containing an acrylamide polymer is increased by increasing the polymer or crosslinking agent concentration of the gelation solution. However, a more cost-effective and oftentimes preferred means for achieving the same effect is to employ a higher molecular weight polymer at a relatively fixed polymer concentration and initial polymer hydrolysis level. Conversely, a reduction in the degree of structure is achieved by using a lower molecular weight polymer. Thus, the skilled practitioner can modify the degree of structure of the present gel in the above-described manner to correspond with the permeability of the treatment region.

In any case, complete crosslinking is achieved when either substantially all of the crosslinking agent or substantially all of the polymer crosslinking sites are consumed by the crosslinking reaction as the gelation solution is aged. Prior to complete crosslinking, the gelation solution is deemed flowing to the extent it is readily displacable from the well bore and through the formation. After complete crosslinking, the gelation solution is fully transformed to a gel that is at least more resistant to flow than the gelation solution and in many cases is non-flowing to the extent it has sufficient strength to resist propagation from the treatment region during subsequent hydrocarbon recovery operations.

Upon complete crosslinking, or complete gelation as it is alternatively termed, a sufficient volume of the newly-formed gel resides in place within the treatment region to reduce the permeability thereof. Consequently, hydrocarbon recovery fluids subsequently injected into the formation more uniformly sweep the untreated hydrocarbon producing zone in preference over the treatment region. It is additionally noted that the gel produced in accordance with the present invention substantially retains its stability when contacted by liquid hydrocarbons within the formation and has a relatively high structural strength. Furthermore, flowing gels produced hereby typically exhibit relatively low mobilities for flow, while non-flowing gels produced hereby typically exhibit a yield pressure greater than injection or production pressures that are commonly encountered during oil production, thereby enabling the gel to remain in place throughout the production life of the subterranean hydrocarbon-bearing formation. The "yield pressure" is defined herein as the maximum pressure that can be applied to the gel in a given geometry having an orifice before the gel experiences structural failure and extrudes through the orifice.

In the practice of a coning treatment, a fluid shutoff treatment, or a squeeze cement treatment, the above-described gelation solution parameters are selected in a manner readily apparent to one skilled in the art to produce a gel satisfying the specific demands of the treatment. For example, squeeze cement treatments are often used to shut off formation zones in fluid communication with the well bore, in a manner requiring greater gel strength than many conformance improvement treatments. Therefore, gels prepared for squeeze cement treatments typically have a substantially greater structural strength and a higher yield pressure than gels prepared for conformance improvement treatments. Placement of the gelation solution for squeeze cement treatments, fluid shutoff treatments and coning treatments, however, like conformance improvement treatments, comprises substantially the same steps of injecting the gelation solution into a well bore and displacing the solution into the treatment region where the gel is formed in situ.

Treatment regions in the formation within the scope of the present invention as applied to squeeze cement treatments include the near well bore, well bore tubing and casing, and well bore annuli. Treatment regions in the formation within the scope of the present invention as applied to coning treatments include matrix and anomalies such as those that provide fluid communication between a well bore and an aquifer or between a well bore and a gas cap.

The following examples demonstrate the practice and utility of the present invention, but are not to be construed as limiting the scope thereof.

EXAMPLES

In examples 1 and 2, 30 cm$^3$ samples of a gelation solution are prepared by adding chromium(III) crosslinking agent complexes in solution to an aqueous polymer stock solution, therby forming the gelation solution. The polymer is polyacrylamide (PA) having a molecular weight of about 500,000 and initially having about 0.75 mole % of its amide groups hydrolyzed. The solvent of the solution is fresh tap water. No pH adjustment is performed during preparation of the samples. The other experimental conditions, however, are varied among the examples.

The samples are gelled by placing them in individual thick-walled glass ampules. The ampules have an inside diameter of 2.4 cm and an internal height of about 12 cm. Free oxygen is removed from the samples and the ampule interiors prior to sealing the ampules under vacuum with a glass blowing torch. The sealed ampules are placed in an air bath at a temperature of 124° C. and the samples are aged for preselected periods of time to form gels. While the samples are aging, the ampules are periodically inverted and the strength of the gels are observed as a function of time in accordance with the following gel strength code.

| Gel stronath god-O | |
|---|---|
| Code* Letter | Gel Strength Characterization |
| A | No detectable gel formed. The gel appears to have the same viscosity (fluidity) as the original polymer solution and no gel can be visually detected. |
| B | High flowing gel. The gel appears to be only slightly more viscous than the initial relatively low-viscosity polymer solution. |
| C | Flowing gel. Most of the obviously detectable gel flows to the bottom upon inversion. |
| D | Moderately flowing gel. A small portion (about 5 to 15%) of the gel does not readily flow to the bottom upon inversion usually characterized as a "tonguing" gel. |
| E | Barely flowing gel. The gel slowly flows to the bottom and/or a significant portion (>15%) of the gel does not flow to the bottom upon inversion. |
| F | Highly deformable nonflowing gel. The gel does not flow to the bottom upon inversion (gel flows to just short of reaching the bottom). |
| G | Moderately deformable nonflowing gel. The gel flows about halfway down to the bottom upon inversion. |
| H | Slightly deformable nonflowing gel. The gel surface only slightly deforms upon inversion. |
| I | Rigid gel. There is no gel-surface deformation upon inversion. |
| S | Syneresis -- expulsion of a water phase. |

*"+" or "−" are symbols that may be associated with a code letter to denote shades of gel strength characterization.

The experimental variables and the results for each example are set forth below.

EXAMPLE 1

Samples of gelation solutions are prepared in the above-described manner. The active polymer concentration of the polymer stock solution is 6.0% by weight. The complexes of sample nos. 1 and 2 represent prior art and are displayed for comparison. The complex of sample no. 1 is commercially available chromium(III)/acetate, wherein the molar ratio of acetate to chromium(III) is 3:1. The complex of sample no. 2 is chromium(III)/malonate formed by combining malonate anions, as sodium malonate, with chromium(III) chloride, wherein the molar ratio of malonate to chromium(III) is 3:1. The complex of sample nos. 3 and 4 is the crosslinking agent precursor of the present invention containing a sodium malonate anionic species and a chromium(III) cationic species in molar ratios of 3.5:1 and 4:1, respectively. The weight ratio of active polymer to chromium(III) cation of each sample is 8.0:1. The chromium(III) cation concentration of each sample is 5400 ppm. The gel strengths for each sample are set forth below in Table 1 as a function of time.

TABLE 1

| | Sample No. | | | |
|---|---|---|---|---|
| | 1 | 2 | 3 | 4 |

TABLE 1-continued

| Crosslinking Agent | CrAc$_{3.0}$ | Cr(NaMal)$_{3.0}$ | Cr(NaMal)$_{3.5}$ | Cr(NaMal)$_{4.0}$ |
| --- | --- | --- | --- | --- |
| wt % complex in initial crosslinking agent solution | 50.0 | 24.6 | 24.6 | 24.6 |
| ppm polymer in gelation solution | 43,300 | 43,100 | 43,300 | 43,400 |
| wt ratio polymer: complex | 1.82:1 | 0.97:1 | 0.85:1 | 0.75:1 |
| ppm complex in gelation solution | 23,800 | 44,300 | 50,900 | 57,600 |
| Aging Time (hrs) | Gel Strength Code | | | |
| 1.0 | I | A | A | A |
| 2.0 | I | A | A | A |
| 4.0 | I | A | A | A |
| 8.0 | I | A | A | A |
| 11 | I | D | A | A |
| 21 | I | I | C− | A |
| 30 | I | I | G | A |
| 46 | I | I | I | C− |
| 72 | I* | I | I | I |
| 1200 | | I | I | I |

*Experiment terminated for this sample

EXAMPLE 2

Samples of gelation solutions are prepared in the above-described manner. The active polymer concentration of the polymer stock solution is 5.0% by weight. The complex of all three samples is the crosslinking agent precursor of the present invention containing a sodium malonate anionic species and a chromium(III) cationic species in a molar ratio of 4:1. The precursor complex concentration in the initial crosslinking agent solution is 24.6% by weight. The gel strengths for each sample are set forth below in Table 2 as a function of time.

TABLE 2

| | Sample No. | | |
| --- | --- | --- | --- |
| | 1 | 2 | 3 |
| Crosslinking Agent | Cr(NaMal)$_{4.0}$ | Cr(NaMal)$_{4.0}$ | Cr(NaMal)$_{4.0}$ |
| ppm polymer in gelation solution | 43,400 | 45,700 | 46,900 |
| wt ratio polymer. complex | 0.75 | 1.22 | 1.70 |
| ppm complex in gelation solution | 57,600 | 37,300 | 27,600 |
| wt ratio polymer.Cr(III) | 8.0:1 | 13.0:1 | 18.0:1 |
| ppm CR(III) in gelation solution | 1400 | 3500 | 2600 |
| Aging Time (hrs) | Gel Strength Code | | |
| 1.0 | A | A | A |
| 2.0 | A | A | A |
| 4.0 | A | A | A |
| 8.0 | A | A | A |
| 11 | A | A | A |
| 21 | A | B | B+ |
| 46 | A | I | I |
| 72 | C− | I | I |
| 96 | I | I | I |
| 1200 | I | I | I |

The data of Table 1 and 2 show the exceptional gelation rate retarding effect at an elevated temperature achieved by means of a chromium(III)/sodium malonate precursor complex having a malonate to chromium molar ratio greater than 3:1. The data further show that the degree of gelation rate retardation is controlled by varying the molar ratio of the malonate to chromium in the precursor complex.

While the foregoing preferred embodiments of the invention have been described and shown, it is understood that alternatives and modifications, such as those suggested and others, may be made thereto and fall within the scope of the present invention.

I claim:

1. A process for substantially reducing the permeability of a treatment region in a hydrocarbon-bearing formation below an earthen surface penetrated by a well bore, the process comprising:
   a) mixing malonate anions with a chromium(III)/acetate complex to form a precursor complex containing one or more chromium(III) cations complexed with said malonate anions;
   b) mixing a gelation solution at an earthen surface including;
      i) a water-soluble crosslinkable polymer,
      ii) said precursor complex, and
      iii) an aqueous solvent,
   c) injecting said gelation solution into a well bore in fluid communication with a subterranean hydrocarbon-bearing formation having a formation temperature at least equal to the decarboxylation temperature of said malonate anions;
   d) heating said malonate anions in said formation to a temperature sufficient to decarboxylate at least one of said malonate anions to an acetate anion;
   e) displacing said gelation solution into a treatment region of said formation; and
   f) gelling said gelation solution at a sufficiently retarded gelation rate to enable said gelation solution to reach said treatment region before complete gelation, thereby producing a gel that substantially reduces the permeability of said treatment region.

2. The process of claim 1 wherein the molar ratio of said malonate anions to said one or more chromium(III) cations in said precursor complex is greater than 3:1.

3. The process of claim 1 wherein said crosslinking agent complex is formed in said treatment region.

4. The process of claim 1 wherein the molar ratio of said poly-carboxylate anions to said one or more chromium(III) cations in said precursor complex is at least 3.5:1.

5. The process of claim 1 wherein said process is a conformance improvement treatment.

6. The process of claim 1 wherein said process is a squeeze cement treatment.

7. The process of claim 1 wherein said process is a coning treatment.

8. The process of claim 1 wherein said process is a fluid shutoff treatment.

* * * * *